UNITED STATES PATENT OFFICE.

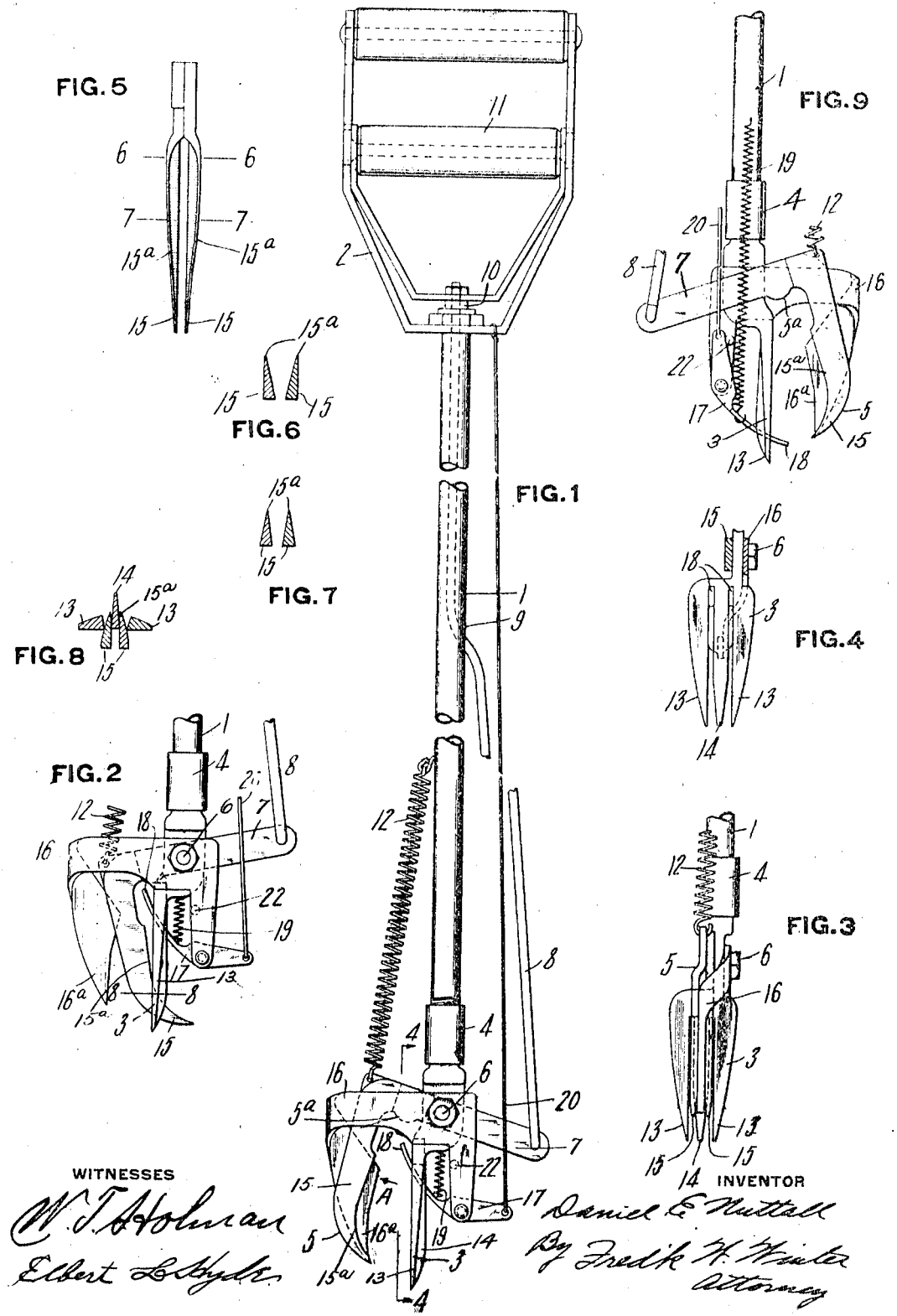

DANIEL E. NUTTALL, OF EMSWORTH, PENNSYLVANIA.

WEED-PULLER.

1,105,684. Specification of Letters Patent. Patented Aug. 4, 1914.

Application filed February 13, 1914. Serial No. 818,545.

*To all whom it may concern:*

Be it known that I, DANIEL E. NUTTALL, a resident of Emsworth, in the county of Allegheny and State of Pennsylvania, have invented a new and useful Improvement in Weed-Pullers, of which the following is a specification.

This invention relates to weed pullers.

The object of the invention is to provide a simple, inexpensive and effective device for removing weeds from lawns without stooping, and which is arranged to firmly grasp the root below its crown and force or pack it into a cone shaped cavity, so that the root is either removed bodily or broken at a point below its crown.

Another object of the invention is to provide an improved weed puller embodying a pair of relatively movable jaws for grasping the root, and also provided with means for ejecting the root or weed therefrom and cleaning the jaws.

Further objects of the invention are in part obvious and in part will appear more in detail hereinafter.

The invention comprises the construction and arrangement of parts hereinafter described and claimed.

In the drawings Figure 1 is a side view of a weed puller embodying the invention, the jaws thereof being in open position; Fig. 2 is a detail view, corresponding to Fig. 1, and showing the jaws closed; Fig. 3 is an edge view of the device as seen from the left, Fig. 1; Fig. 4 is a detail sectional view on the line 4—4, Fig. 1, showing the movable cleaning member; Fig. 5 is a detail view of the movable jaw member, looking at the same in the direction of the arrow A, Fig. 1; Figs. 6 and 7 are detail cross sectional views on the lines 6—6, 7—7, Fig. 5, respectively; Fig. 8 is a cross sectional view on the line 8—8, Fig. 2; and Fig. 9 is a view corresponding to Fig. 1, of the other side of the device, and showing the movable cleaner in another position.

The weed puller shown in the drawings comprises a rigid rod or staff, shown as a pipe or tube 1, which, at one end, is provided with a handle frame 2, and at its other end with a pair of gripping jaws for grasping the weed or root to be removed. One of said jaws, such as the jaw 3, is rigid with the rod or staff 1, being shown as connected thereto by a nipple or threaded member 4. The other jaw 5 is pivotally connected to the rod or staff, being shown as pivoted to the fixed jaw 3 on a suitable bolt 6. Said jaw is L-shaped, one arm 7 being pivotally connected to a tension member 8, shown as a rod which extends longitudinally of the rod or staff, 1 and through an aperture 9 in the side wall thereof, its opposite end projecting from the end of the tube 1, where it is adjustably connected, as by the nuts 10 threaded thereon, to a handle member 11 which is movable in the frame 2. In one position the nut 10 abuts against the end of the tube 1 to limit movement of the movable jaw 5 in a direction to open the jaws. The jaws are opened and normally held open by a suitable spring 12, shown as a coiled tension spring connected at one end to the rod or staff and at the other end to the movable jaw member 5. They are closed by moving the handle member 11 in the frame 2 to oscillate the movable jaw against the action of spring 12. Jaw 5 is preferably provided with a heel or projection 5ª which abuts against the fixed jaw 3 when said jaws are closed and which limits the approach of said jaws toward each other. The jaws 3 and 5 are preferably each provided with a plurality of pointed teeth or prongs, jaw 3 being provided in the form shown, with three teeth or prongs, namely, two outer teeth 13 and an inner tooth 14, which are all substantially straight and parallel. The jaw 5 is provided with two teeth or prongs 15, which are arranged in staggered relation with the teeth of the jaw 3, so that in closed position the teeth on the two jaws interlock. The teeth on jaw 5 are curved at their ends toward the jaw 3, so that they project into the spaces therebetween when the jaws are closed, while the main portions of the teeth 15 lie substantially parallel with jaw 3. Teeth 15 are substantially triangular in cross section, as shown in Figs. 6, 7 and 8, having wide backs spaced uniformly apart throughout the length of the teeth, and a blunt inner edge 15ª. The edges 15ª of the two teeth converge toward their points, so that the space 15ª between said teeth is somewhat cone-shaped. Tooth 14 on the jaw 3, which projects between the teeth 15 when the jaws are closed, is comparatively thick to enable it to withstand the pressure of jaw 5 in grasping the weed, while the two side teeth 13 are shallow but comparatively wide, being adapted to support the teeth 15 against lateral strain and prevent them from spreading when the jaws are closed. Three teeth are also used on jaw 3 in order to form a firm fixed fulcrum when the device is inserted in the ground, so that jaw 5 will move toward jaw 3 when the device is operated, and not jaw 3 toward jaw 5.

The device is used by forcing the jaw 3 into the earth at one side of the root of the weed. This may be done by pressure upon the handle 2, but preferably by merely dropping the tool, like a cane or spear, at the proper location, the device having sufficient weight so that it will force its own way by gravity into the earth to the proper depth. Handle 11 is then operated to close the two jaws 3 and 5. The root, or its crown, is grasped between the two teeth 15 of jaw 5 and tooth 14 of jaw 3 and is forced into the wedge or cone shaped space between the teeth of jaw 5, the pointed ends of which project between the teeth of jaw 3. By pulling upwardly on the handle the root is drawn down and wedged tightly into the cavity or cone shaped space between the jaw teeth, but without cutting the root, so that it is easily removed from the ground without liability of leaving the crown therein. In many cases the entire root is removed but removal of the crown kills the plant even if a part of the root remains.

Preferably, the device is provided with suitable means for cleaning the jaw teeth and freeing them from dirt, stones, fragments of weeds, roots or the like, which frequently collect and fill up the spaces between the prongs. In the form shown the movable jaw 5 is arranged to coöperate with a rigid cleaning or ejecting device, shown as a bent metal member 16 secured to the rod or staff 1 and the outer portion 16ª of which lies in such position that when the jaws are opened it enters between the parallel teeth 15 of the jaw 5, thereby forcing out any material which has collected therebetween. The teeth of the fixed or rigid jaw member 3 are cleaned by a movable cleaning device, shown as an arm or member 17, pivoted to the member 16, and the inner end of which is provided with two prongs 18 which normally lie in the roots of the teeth 13, 14 and are held there by a spring 19 connected to the rod or staff 1. To the outer arm of the lever 17 is connected an operating member, such as a cord or cable 20, which may have its other end secured to the handle frame 2. Member 16 is provided with a suitable stop pin 22 arranged to contact with the arm 17 and limit movement of the cleaning member in one direction. Periodically the movable cleaning device is operated by pulling on the cord or cable 20 to swing its teeth or prongs 18 from the position shown in Fig. 1 to that shown in Fig. 9, which thereby forces out from between the teeth any material which has collected therein.

The device described is of simple construction and can be readily manipulated with one hand. It does not need to be forced very deeply into the ground, as it is found from experience that by removing merely the top of the weed and its cap or crown, the remaining portion of the root dies. The device insures removal of the crown and at least the upper portion of the root, as it wedges the material in between the teeth and is not liable to lose its grasp. It is also easily cleaned without stopping and does not clog up.

What I claim is:

1. A weed puller, comprising a rigid rod carrying a pair of relatively movable jaws at one end, a spring for moving one of said jaws in one direction, and a handle member for moving it in the other direction, one of said jaws being provided with a plurality of teeth having portions which converge toward the points of the teeth, whereby a root is wedged between said teeth by lifting the device.

2. A weed puller, comprising a rigid rod carrying a pair of relatively movable jaws at one end, means for moving said jaws relatively to each other in both directions, one of said jaws having a plurality of teeth having portions which converge toward the points of the teeth and thereby form a cone-shaped cavity therebetween, whereby a root is wedged in said cavity by lifting the device.

3. A weed puller, comprising a rigid rod having a pair of relatively movable jaw members at one end, means for moving said jaws relatively to each other in both directions, one of said jaw members being provided with a plurality of teeth and a movable cleaning device having portions normally lying in the roots of said teeth and arranged when moved to travel through the spaces between said teeth.

4. A weed puller, comprising a rigid rod having a pair of relatively movable jaw members at one end, means for moving said jaws relatively to each other in both directions, one of said jaw members being provided with a plurality of teeth, a movable cleaning device having portions normally lying in the roots of said teeth and arranged when moved to travel through the spaces between said teeth, a spring for moving said device in one direction, and manually operable means for moving it in the other direction.

5. A weed puller, comprising a rigid rod carrying a rigid jaw member at one end, a movable jaw member connected thereto, means for moving said movable jaw member, said movable member being provided with a plurality of teeth having portions which converge toward their points thereby providing a cone-shaped space therebetween, whereby a root is wedged between said teeth when the device is lifted.

6. A weed puller, comprising a rigid rod carrying a fixed jaw member at one end thereof, a jaw member pivotally mounted thereon, a spring connected to said pivoted jaw member for opening the jaws, each of said jaw members being provided with a plurality of teeth, a fixed cleaning device arranged to coöperate with the movable jaw member, and a movable cleaning device arranged to coöperate with the fixed jaw member.

7. A weed puller, comprising a rigid rod carrying a fixed jaw member at one end thereof, a jaw member pivotally mounted thereon, a spring connected to said pivoted jaw member for opening the jaws, each of said jaw members being provided with a plurality of teeth, a fixed cleaning device arranged to coöperate with the movable jaw member, and a movable cleaning device arranged to coöperate with the fixed jaw member, said movable cleaning device having portions normally lying in the roots of the teeth an arranged when operated to move through the spaces between the teeth of the fixed jaw member.

In testimony whereof, I have hereunto set my hand.

DANIEL E. NUTTALL.

Witnesses:
GLENN H. LERESCHE,
WILLIAM B. WHARTON.

Copies of this patent may be obtained for five cents each, by addressing the "Commissioner of Patents, Washington, D. C."